Dec. 22, 1925.                                                            1,566,344
                         H. PERROT ET AL
                 METALLIC WHEEL FOR MOTOR VEHICLES
                      Filed July 24, 1922         4 Sheets-Sheet 1
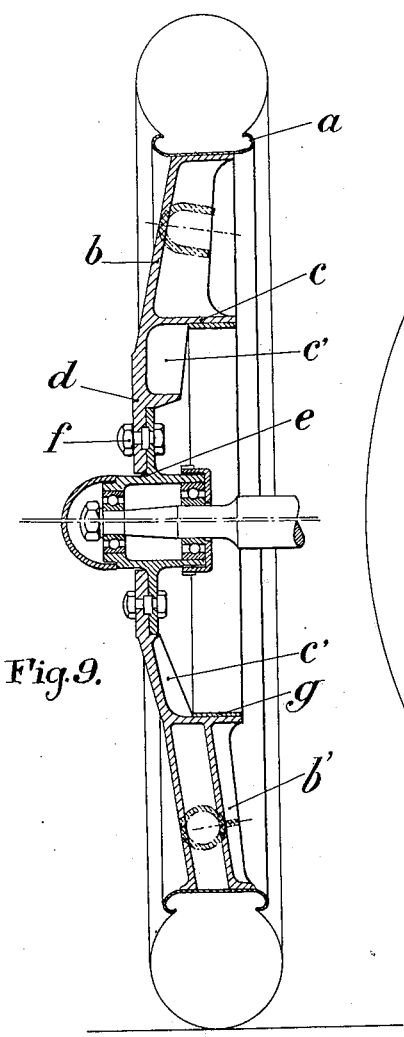
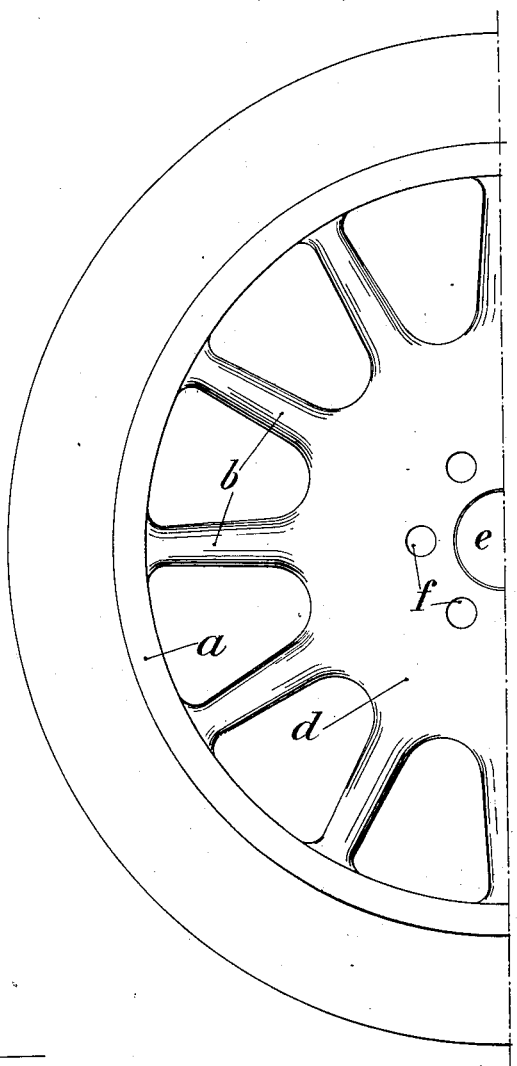
Inventors
H. Perrot
G. Calvignac
By Marks&Clerk Attys Dec. 22, 1925.
H. PERROT ET AL
1,566,344
METALLIC WHEEL FOR MOTOR VEHICLES
Filed July 24, 1922     4 Sheets-Sheet 2
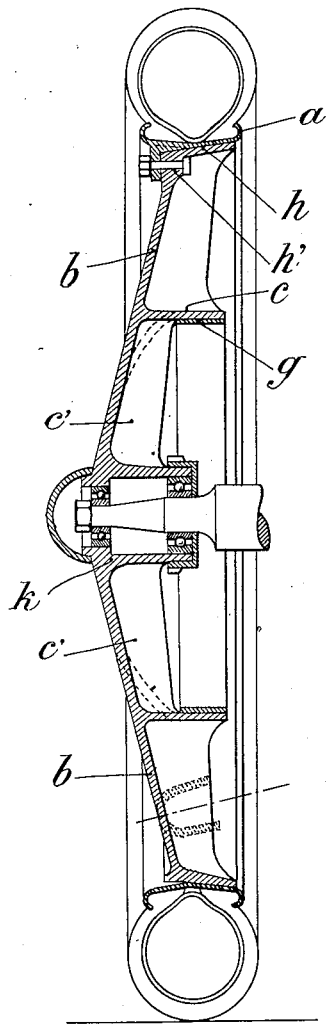
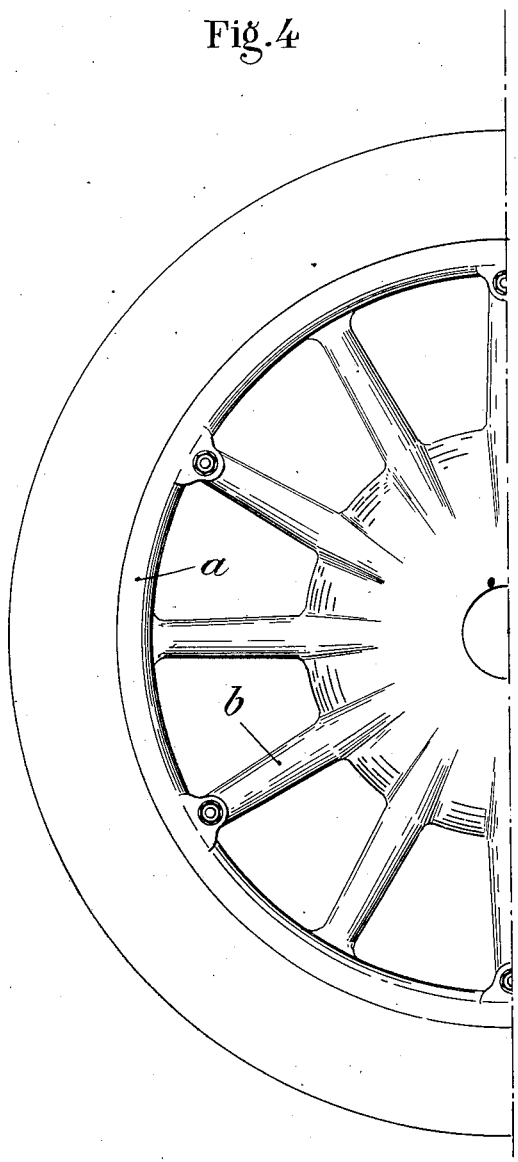
Inventors
H. Perrot
G. Calvignac
By Marks Clerk Atty's Dec. 22, 1925.

H. PERROT ET AL 1,566,344

METALLIC WHEEL FOR MOTOR VEHICLES

Filed July 24, 1922  4 Sheets-Sheet 3

Inventors
H. Perrot
G. Calvignac
By Marks Clerk Attys

Dec. 22, 1925.

H. PERROT ET AL 1,566,344

METALLIC WHEEL FOR MOTOR VEHICLES

Filed July 24, 1922   4 Sheets-Sheet 4

Inventors
H. Perrot
G. Calvignac
By Marks&Clerk Attys

Patented Dec. 22, 1925.

1,566,344

UNITED STATES PATENT OFFICE.

HENRI PERROT, OF PARIS, AND GERMAIN CALVIGNAC, OF LEVALLOIS-PERRET, FRANCE.

METALLIC WHEEL FOR MOTOR VEHICLES.

Application filed July 24, 1922. Serial No. 577,191.

*To all whom it may concern:*

Be it known that we, HENRI PERROT and GERMAIN CALVIGNAC, citizens of the French Republic, residing, respectively, at Paris, in the Republic of France, and Levallois-Perret, Seine, in the Republic of France, have invented new and useful Improvements in Metallic Wheels for Motor Vehicles, of which the following is a specification.

This invention relates to a metallic wheel for motor vehicles which is essentially characterized in that the brake drum and the wheel itself are constructed by moulding or pressing a single piece in moulds or matrices which are preferably of metal, the wheel in light metal having an external appearance resembling a wheel with wood spokes or a disc wheel, and being usually, removable or with removable rim.

As concerns front wheel braking, it has been observed that an increase of weight of the front axle is prejudicial to the suspension and steering of the wheel, and on the other hand during prolonged braking on the front or rear wheels, the heat caused by each brake is given off in a defective manner, thereby producing expansion of the brake drum which acts against the proper adjustment and good performance.

These drawbacks are obviated in the wheel according to the present invention, since the wheel is cast or pressed in one piece of a light and strong alloy whose coefficient of expansion is as small as possible, in metal moulds or matrices with or without pressure. On the other hand, the wheel has a very good appearance, for all the brake elements can now be placed in the interior.

The following description, together with the accompanying drawings which are given by way of example, sets forth various embodiments of the invention.

Fig. 1 is a diametral section of a removable wheel provided with spokes having a U-shaped section.

Fig. 2 is a half-front view of said wheel.

Fig. 3 is a diametral section and half front view of a removable wheel with cheek.

Fig. 4 is a half front view of the same.

Fig. 9 is a half diametral section similar to Fig. 1 of a removable wheel provided with spokes of annular cross section.

The removable wheel represented in Figs. 1 and 2 is made in one piece, and preferably of a light alloy; said piece is cast or pressed in metal moulds or matrices with or without pressure, thus providing an element which is light, cheap and very substantial. The wheel rim $a$ is suitably secured to said element which comprises the spokes $b$, brake drum $c$ and a central portion $d$ which serves to secure the said wheel to the hub $e$ mounted on the axle, said central portion being attached for example by the bolts $f$. It is obvious that any other known arrangement for dismountable wheel can be employed.

The spokes $b$ may be given any suitable shape; they may be U-shaped as represented in Fig. 1 or of annular shape with rib $b'$ as shown in Fig. 9, these two shapes affording a very good cooling of the wheel in motion, so as to rapidly dissipate the heat of braking, the heat being conducted over the entire wheel and dissipated by the cooling of the same. The brake drum $c$ which is mounted within the wheel is provided with internal ribs $c'$ which prevent it from getting out of shape, and it may have mounted at the interior a hoop or liner $g$ of cast iron or steel which may be riveted to, cast with, or otherwise fastened thereto, and it is obvious that the liner may extend beyond the drum if desired, it being understood that the liner is of a material different from the frame of the wheel and is of a material which is suitable to resist the wear of the brake shoes, which are, of course, arranged so as to engage the hoop or liner $g$ when they are acted upon to brake the vehicle.

Figs. 3 and 4 show a second form of construction. The wheel is of the removable rim type, and the means of removal may be of known construction. The frame of the wheel is in all cases cast or formed in one piece, and is provided at $h$ with a suitable part co-operating with the wheel rim $a$, and at $h'$ with bosses traversed by bolts for securing said rim. The spokes $b$ herein indicated are supposed to have a U-shape; but might have an annular section, as above stated; the brake drum $c$ is shown with its braking hoop *g*, and is made absolutely rigid in all cases by the ribs *c'*. In this case the hub *k* can be cast with the wheel. It is observed that the stiffening ribs are still disposed within the wheel, so that the latter will have a very plain appearance.

Figure 5:
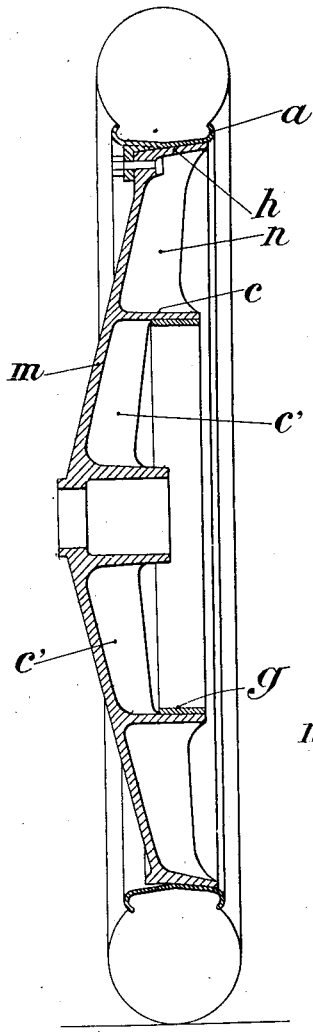
Fig. 5 is a diametral section of a disc wheel with detachable rim.
Figure 6:
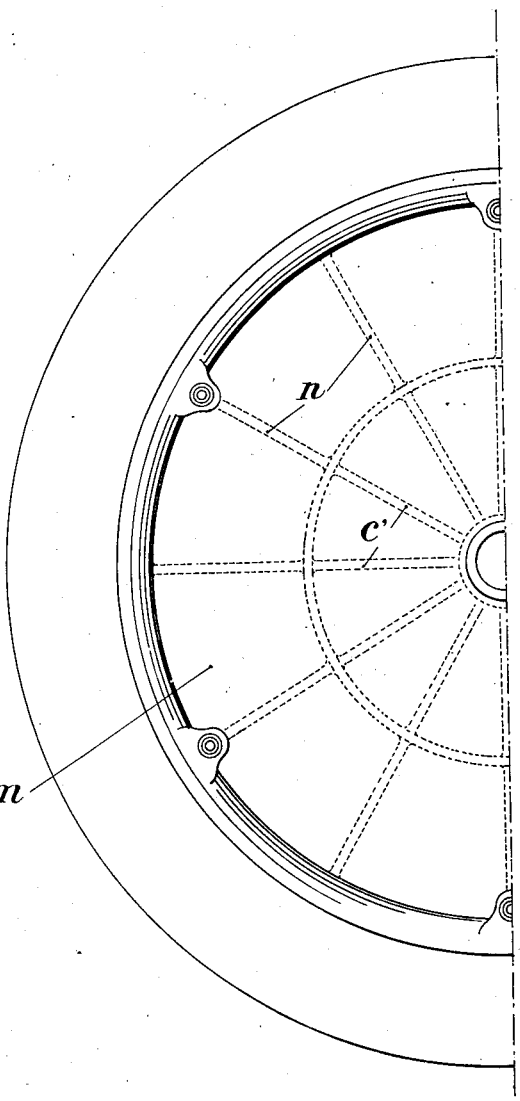
Fig. 6 is a half front view of the same.

Figs. 5 and 6 show the form of a wheel with removable rim and with a disc portion *m* which has ribs at *n*, and the said ribs provide for the requisite stiffness and also carry out the cooling of the wheel. The remainder of the wheel is constructed as shown in Figs. 3 and 4. A removable disc wheel which is analogous to the one shown in Figs. 1 and 2 might also be constructed.

Figure 7:
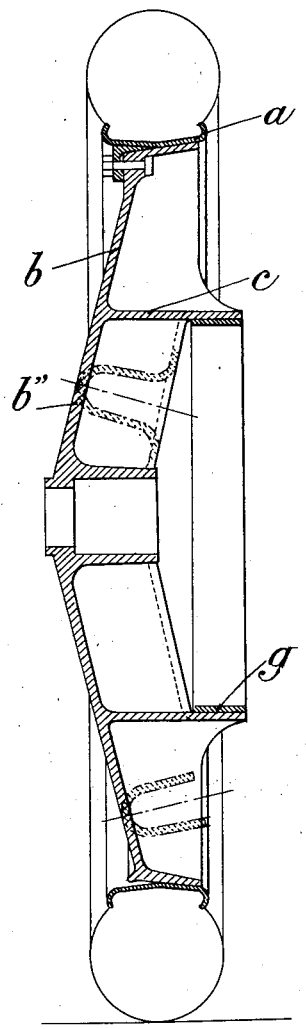
Figs. 7 and 8 show in diametral section and half front view a modified form of construction of the wheel with spokes and with removable rim.
Figure 8:
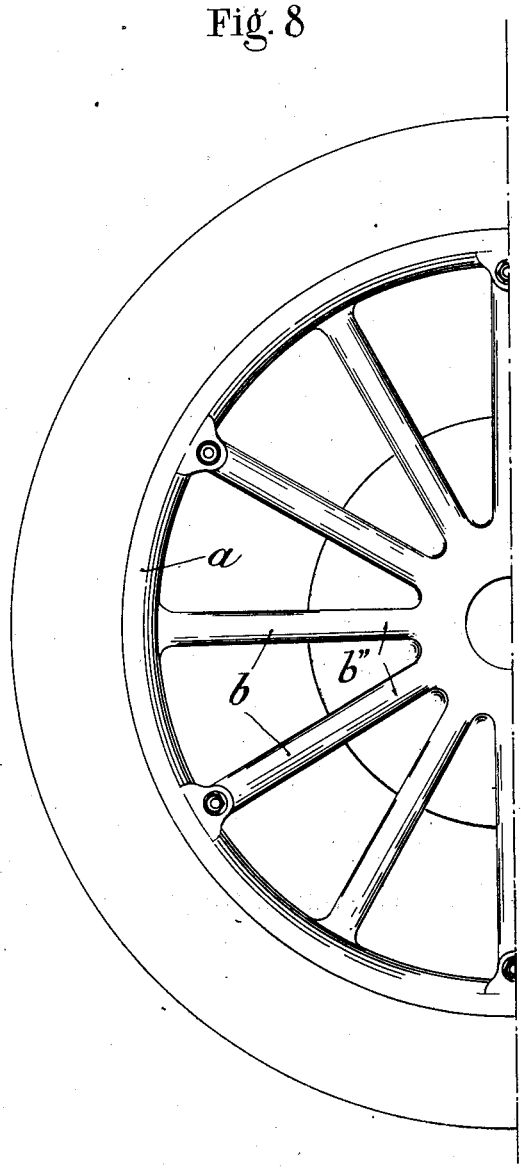

Figs. 7 and 8 show a modified form of construction of the wheel with spokes and with removable rim, wherein the spokes *b* instead of being arrested at the brake drum, now extend at *b''* towards the centre of the wheel, the drum *c* being now disposed within the wheel in a less complete manner. Fig. 7 shows partial sections of a spoke in the part *b* and the part *b''* wherein the spokes are formed together with the brake drum. It will be noted that in all the constructions above described the reinforcing ribs *b'* or *n* extend longitudinally over the whole length of the outer surface of the brake drum, as shown in the drawing, so that the brake drum is strongly provided against the deformation which might occur from the braking stresses.

It is obvious that various constructional modifications may be made in the said wheels without departing from the limits of the invention.

Having now described our invention, what we claim as new and desire to secure by Letters Patent is:

1. A wheel for motor vehicles comprising a frame in one piece of light metal having a good heat conduction and constituted by a solid central part and spoke portions of arcuate cross-section, a wheel rim secured to the outer ends of said spoke portions, a brake drum integral with said frame, radial reinforcing ribs integral with said spoke portions and brake drum, and extending longitudinally toward the inner end of said brake drum, a reinforcing hoop upon the inner surface of said brake drum and means for mounting said frame upon the vehicle axle.

2. A wheel for motor vehicles comprising a frame in one piece of light metal having a good heat conduction and constituted by a solid central part and spoke portions of arcuate cross-section, a wheel rim secured to the outer ends of said spoke portions, a brake drum integral with said frame, radial reinforcing ribs integral with said spoke portions and brake drum, and extending longitudinally toward the inner end of said brake drum, a reinforcing hoop upon the inner surface of said brake drum, a false hub mounted on the vehicle axle and means for removably mounting said frame on said false hub.

3. A wheel for motor vehicles comprising a frame of one piece of metal having a central flange and constituted by an integral central part, having spoke portions of arcuate cross section, a wheel rim secured to the outer ends of said spoke portions, a brake drum integral with said frame, radial reinforcing ribs integral with said spoke portions and brake drum, and extending longitudinally toward the inner end of said brake drum, a hub mounted on the vehicle axle and having a flange extending outwardly therefrom into cooperative relationship with the flange on said frame, and means for detachably fastening said flanges together.

4. A wheel for motor vehicles comprising a frame of one piece of cast metal having a central flange and carrying a brake drum between the flange and the rim, a hub mounted on the vehicle axle and having a flange extending radially outwardly therefrom into cooperative relationship with the flange on said frame, reinforcing ribs extending in two directions from said drum and means for detachably fastening said flanges together.

5. A wheel for motor vehicles comprising a frame of one piece of light cast metal including a brake drum having reinforcing ribs extending radially in two directions therefrom, a liner of braking material carried by the drum, and means for mounting said wheel upon the vehicle axle.

6. A wheel comprising a frame including a brake drum and a tire-carrying portion connected by reinforcing ribs extending substantially to the free edge of the brake drum.

7. A wheel comprising a frame including a brake drum and having relatively short inner ribs leaving a braking surface unobstructed and longer outer ribs reinforcing said braking surface against distortion.

In testimony whereof we have signed our names to this specification.

HENRI PERROT.
GERMAIN CALVIGNAC.